United States Patent
Paradas-Palomo et al.

(10) Patent No.: US 11,161,935 B2
(45) Date of Patent: Nov. 2, 2021

(54) METHOD FOR PRODUCING FUNCTIONALIZED POLYESTERS

(71) Applicant: Henkel AG & Co. KGaA, Duesseldorf (DE)

(72) Inventors: Miguel Paradas-Palomo, Barcelona (ES); Sonia Flores-Penalba, Barcelona (ES); José Garcia-Miralles, Duesseldorf (DE); Hans-Georg Kinzelmann, Pulheim (DE); Rosa Maria Sebastián Pérez, Barcelona (ES); Jorge Marquet Cortés, Barcelona (ES); Jorge Aguilera Corrochano, Barcelona (ES); Federica Arioli, Barcelona (ES)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/673,050

(22) Filed: Nov. 4, 2019

(65) Prior Publication Data

US 2020/0062894 A1 Feb. 27, 2020

Related U.S. Application Data

(63) Continuation of application No. PCT/EP2018/061173, filed on May 2, 2018.

(30) Foreign Application Priority Data

May 11, 2017 (EP) .................................. 17170636

(51) Int. Cl.
   *C08G 64/38* (2006.01)
   *C08G 63/58* (2006.01)
   *C08G 63/78* (2006.01)

(52) U.S. Cl.
   CPC ............. *C08G 63/58* (2013.01); *C08G 63/78* (2013.01)

(58) Field of Classification Search
   USPC ........................................................ 528/366
   See application file for complete search history.

(56) References Cited

U.S. PATENT DOCUMENTS

| | | |
|---|---|---|
| 2,915,529 A | 12/1959 | Bell et al. |
| 3,056,818 A | 10/1962 | Werber et al. |
| 3,404,018 A * | 10/1968 | Hicks ............ C08G 63/06 106/252 |
| 4,310,708 A | 1/1982 | Strege et al. |
| 5,359,094 A | 10/1994 | Teles et al. |
| 5,969,056 A | 10/1999 | Nava |
| 6,025,504 A | 2/2000 | Claude et al. |
| 6,388,024 B1 | 5/2002 | Van Gaalen et al. |
| 10,202,488 B2 | 2/2019 | Cron et al. |
| 2018/0291153 A1 | 10/2018 | Cron et al. |

FOREIGN PATENT DOCUMENTS

| | | |
|---|---|---|
| EP | 0328150 A2 | 8/1989 |
| EP | 1156042 A1 | 11/2001 |
| EP | 2582687 B1 | 11/2014 |
| WO | 2012007254 A1 | 1/2012 |
| WO | 2016124518 A1 | 8/2016 |
| WO | 2017001172 A1 | 1/2017 |

OTHER PUBLICATIONS

International Search Report for International PCT Patent Application No. PCT/EP2018/061173 dated Jul. 4, 2018.
Tomita et al. Reactivity comparison of five- and six-membered cyclic carbonates with amines: Basic evaluation for synthesis of poly(hydroxyurethane) Journal of Polymer Science, vol. 39, Issue 1, Jan. 1, 2001, pp. 162-168.
Lamarzelle et al. Activated lipidic cyclic carbonates for non-isocyanate polyurethane synthesis Polymer Chemistry, 2016, 7, 1439-1451.

* cited by examiner

*Primary Examiner* — Terressa Boykin
(74) *Attorney, Agent, or Firm* — James E. Piotrowski

(57) ABSTRACT

The present application is directed to a method for preparing a cyclic carbonate functional polyester, said method comprising: reacting glycerine carbonate with an anhydride to form an Adduct (A); and, reacting said Adduct (A) with at least one polyepoxide compound to form said cyclic carbonate functional polyester (CC-PES). More particularly, the present application is directed to a method for preparing a cyclic carbonate functional polyester, said method comprising the stages: A) reacting glycerine carbonate with an anhydride to form an Adduct (A); B) providing a polycarboxylic acid; C) reacting said polycarboxylic acid with at least one diglycidyl ether to form an epoxy functional polyester; and, D) reacting said epoxy functional polyester with said Adduct (A) to form said cyclic carbonate functional polyester.

18 Claims, No Drawings

METHOD FOR PRODUCING FUNCTIONALIZED POLYESTERS

FIELD OF THE INVENTION

The present application is directed to a method for producing functionalized polyesters. More particularly, the application is directed to method for producing cyclic carbonate functionalized polyesters and to the use of said polyesters in coating, adhesive or sealant compositions.

BACKGROUND TO THE INVENTION

The use of polyurethanes in coating, adhesive and sealant formulations is well-known and long established. Such polyurethanes contain precursor materials that cure in place to form an adhesive layer: conventionally the curative compounds include one or more polyisocyanate compounds and one or more isocyanate-reactive compounds, such as polyols. Depending on the selection of those curative compounds, a given polyurethane coating, adhesive or sealant can be formulated to cure at room temperature or upon exposure to certain physicochemical conditions.

The isocyanates present in such conventional polyurethane formulations represent a toxicological risk. This relates, on the one hand, to the processing of these materials during their use, because the isocyanates normally have a high toxicity and a high allergenic potential. On the other hand, there is the risk that, in flexible substrates, incompletely reacted aromatic isocyanate migrates through the substrate and is there hydrolyzed by moisture or water-containing components to carcinogenic aromatic amines.

Isocyanate-free one (1K) and two (2K) component systems for hardenable coating compositions which have good hardening properties, ideally even at room temperature, are therefore desirable. And it has already been recognized in the art that cyclic carbonates, which can react with amines to form urethanes at room temperature, could represent an important alternative to polyurethane formation by the aforementioned isocyanate/polyol reactions. However, there are known impediments to the more ubiquitous use of cyclic carbonates to generate NCO-free polyurethanes (NIPUs): i) cyclic carbonates have, typically, limited reactivity, even in the presence of catalysts such as amidines, guanidines and thioureas; ii) the ring-opening reaction of the cyclic carbonate has poor selectivity such that mixtures of the stable secondary alcohol with the less stable primary alcohol are formed; and, iii) as a corollary, the polyurethanes formed tend to be of low molecular weight which limits their utility.

Tomita et al. *Reactivity comparison of five- and six-membered cyclic carbonates with amines: Basic evaluation for synthesis of poly(hydroxyurethane)* Journal of Polymer Science, Volume 39, Issue 1, 1 Jan. 2001, Pages 162-168 noted the limited reactivity of 5-(2-propenyl)-1,3-dioxan-2-one (1) and 4-(3-butenyl)-1,3-dioxolan-2-one (2) with hexylamine and benzylamine. However, that author also found that the reactivity of those cyclic carbonates was dependent upon the substituent group (R) disposed in the 4-position thereof. For instance, reactivity increases in the order for R: Me<H<Phenyl<CH$_2$OPh<CF$_3$. Whilst this was instructive, such fluorinated compounds are not readily accessible, are expensive and potentially toxic. Moreover, monomeric cyclic compounds are not suitable for use as binders in coatings, adhesive or sealant formulations.

Lamarzelle et al. *Activated lipidic cyclic carbonates for non-isocyanate polyurethane synthesis* Polymer Chemistry, 2016, 7, 1439-1451 describes a way to activate the cyclic carbonate ring by incorporating electron withdrawing groups including—ester or ether moieties—in the beta position to enhance its reactivity towards amines. This citation per se is limited in its commercial application: the synthesis procedure and the catalyst employed to prepare the bifunctional ester-cyclic carbonate materials are not industrially feasible due to high cost; and, the synthesis yields crystalline materials at room temperature. That aside, the present inventors have recognized the potential in developing high molecular weight cyclic carbonate functional polyesters in which ester groups are disposed in the beta-position of 5-membered cyclic carbonate groups.

WO2016/124518 A1 (Evonik Degussa GMBH) describes a process for preparing cyclic carbonate-bearing polymers, and in particular cyclic carbonate-bearing polyesters. In the latter embodiment, the polyesters are obtained in a two-step process. Firstly, a carboxyl-terminated polyester is synthesized. In a second step, that carboxyl-terminated polyester is esterified using glycerine carbonate. This second step is performed typically in the presence of Lewis acids or strong acids, such as methane sulfonic acid, which will require removal from the final product and which can also darken that final product. Moreover, in the exemplified embodiments of that second step, reaction temperatures of ≥180° C. are employed at which glycerine carbonate is not stable.

WO2012/007254 (Total Petrochemical Res. Feluy et al.) describes a process for preparing poly(carbonate-urethane) or poly(ester-urethane) that comprises the steps of: a) ring-opening polymerization of a first 5-, 6- or 7-membered cyclic carbonate or of a cyclic ester or diester, optionally bearing functional groups, in the presence of a first catalyst system and in the presence of one or more diols or polyols acting both as co-initiators and chain transfer agents; b) chemical modification of the hydroxyl chain-end groups into carboxylic groups in the presence of a second catalyst system; c) a coupling reaction with at least 2 equivalents of a second 5-, 6-, or 7-membered cyclic carbonate, bearing at least one functional group enabling coupling with the carboxylic moiety, in the presence of a third catalyst system; d) polyaddition of a diamine or a polyamine via ring-opening of the second terminal 5-, 6-, or 7-membered cyclic carbonate of step c); and, e) recovery of the poly(carbonate-urethane) or poly(ester-urethane).

EP 2 582 687 B1 (Construction Research & Technology GMBH) describes a two-step process for the preparation of a cyclic carbonate functional polyester. The first step provides for the formation of a 5-membered cyclic carbonate according to the following, illustrative reaction scheme:

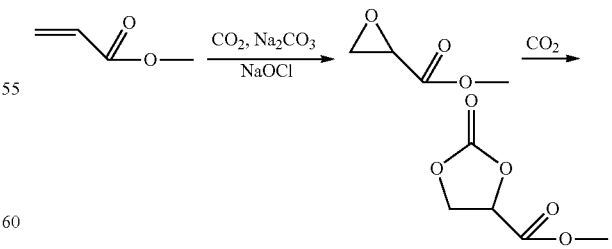

In a second step, the derived cyclic carbonate is trans-esterified with a polyol but in the requisite presence of an exotic catalyst, more particularly either an enzymatic catalyst or an acidic cation exchanger. An exemplary second step according to this citation is illustrated below:

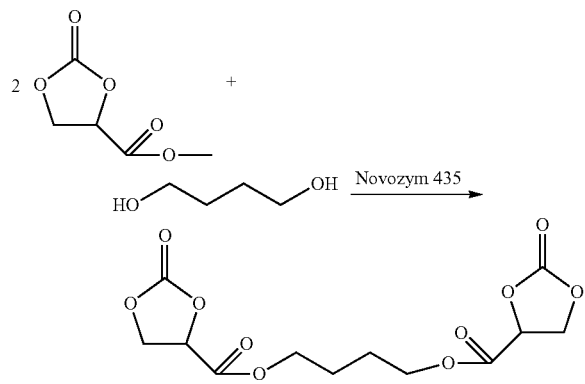

Having regard to the above described citations there remains a need in the art to provide a simple, cost effective and industrially feasible method for the synthesis of 5-membered cyclic carbonate functionalized oligomers or polymers, in which the polyester group is disposed in the beta position.

STATEMENT OF THE INVENTION

In accordance with a first aspect of the present invention there is provided a method for preparing a cyclic carbonate functional polyester, said method comprising: reacting glycerine carbonate with an anhydride to form an Adduct (A); and, reacting said Adduct (A) with at least one polyepoxide compound to form said cyclic carbonate functional polyester (CC-PES).

The reactant anhydride will usually be an anhydride of an acid selected from the group consisting of: maleic acid; fumaric acid; citraconic acid; itaconic acid; glutaconic acid; phthalic acid; isophthalic acid (IA); terephthalic acid; cyclohexane dicarboxylic acid; adipic acid; sebacic acid (SeA); azealic acid; malonic acid; succinic acid; alkyl succinic acids; alkenyl succinic acids; glutaric acid; alkyl glutaric acids; alkenyl glutaric acids; and, mixtures thereof. Preferably, the reactant anhydride is selected from the group consisting of: maleic anhydride; adipic anhydride; succinic anhydride; alkyl succinic anhydrides; alkenyl succinic anhydrides; glutaric anhydride; alkyl glutaric anhydrides; alkenyl glutaric anhydrides; and, mixtures thereof.

The reaction of glycerine carbonate with said anhydride—referred to as Stage A in certain embodiments herein below—will typically be performed under at least one of the following limitations: i) an anhydride: glycerine carbonate molar ratio in the range from 2:1 to 0.8:1, preferably in the range from 1.2:1 to 0.8:1 and more preferably in the range from 1.1:1 to 0.9:1; ii) a temperature in the range from 60° to 180° C., preferably from 80° to 150° C.; and, iii) anhydrous conditions. For completeness, it is noted that these process limitations are not mutually exclusive and one, two or three of the limitations may be effected.

When carrying out the reaction of the Adduct (A) with the at least one polyepoxide compound, it should be ensured that all the epoxy groups originally present have reacted. The compounds might thus be reacted at an equivalence ratio of the carboxyl groups to the epoxy groups of at least 1:1, for example at an equivalence ratio of (1.0-1.2):1 or (1.0-1.1):1.

In a significant embodiment of the present invention, there is provided a method for preparing a cyclic carbonate functional polyester, said method comprising the stages: A) reacting glycerine carbonate with an anhydride to form an Adduct (A); B) providing a polycarboxylic acid; C) reacting said polycarboxylic acid with at least one diglycidyl ether to form an epoxy functional polyester (Epoxy-PES); and, D) reacting said epoxy functional polyester with said Adduct (A) to form said cyclic carbonate functional polyester (CC-PES).

By preference, the polycarboxylic acid provided in Stage B is a dicarboxylic or tricarboxylic acid, with dicarboxylic acids being particularly desired. In an alternative but not mutually exclusive expression of preference, the provided polycarboxylic acids should generally be characterized by an acid value (Av) of from 50 to 1200 mgKOH/g and will preferably be characterized by an acid value (Av) of from 80 to 1100 mgKOH/g.

In an important embodiment, the polycarboxylic acid is a carboxyl functional polyester (Carboxy-PES). The means of producing or providing such a carboxyl functional polyester at Stage B is not particularly limited. However, it is desired that the provided carboxyl functional polyester (Carboxy-PES) be characterized by an acid value (Av) of from 50 to 500 mgKOH/g, preferably from 80 to 430 mgKOH/g.

In an illustrative process, the carboxyl-functional polyester (Carboxyl-PES) of Stage B is provided by the steps of: i) providing a polyester having two or more hydroxyl groups; and, ii) reacting said hydroxyl functional polyester with a carboxylic acid or an anhydride thereof. The so-provided hydroxyl functional polyester may preferably be characterized by having a hydroxyl number of from 50 to 300 mgKOH/g, preferably from 80 to 150 mgKOH/g.

In an alternative process, the carboxyl functional polyester (Carboxy-PES) of Stage B is provided by the reaction of a stoichiometric excess of a dicarboxylic acid with at least one diol in the presence of a catalytic amount of an esterification catalyst.

In Stage C of the above defined process, it is preferred that the or each diglycidyl ether has an epoxy equivalent weight of from 100 to 700 g/eq, preferably from 120 to 320 g/eq. Independently of this however, it is preferred in Stage C that the molar ratio of the diglycidyl ether compounds to the polycarboxylic acid—where applicable, the carboxyl functional polyester—is from 1.5:1 to 3:1, preferably from 1.8:1 to 2.2:1.

The aforementioned equivalence ratio of carboxyl groups to epoxy groups remains applicable to the reaction, in stage D, of the adduct (A) and the epoxy-functional polyester, the identified polyepoxide compound. Illustratively, in the Stage D reaction, the molar ratio of the Adduct (A) to the epoxy functional polyester (Epoxy-PES) may be from 2:1 to 3:1, preferably from 2:1 to 2.5:1.

It is noted that effective processes according to the present invention include the performance of both of Stages C and D: i) at a temperature range of from 40° to 180° C., preferably from 60° to 170° C.; and/or, ii) in the presence of a catalytic amount of a basic catalyst. Such a temperature range equates to mild conditions which, in the reaction of Stage D, can prevent the 5-membered cyclic carbonate ring of the adduct from opening.

It is further noted that the process of the present invention has been performed effectively where Stages B to D have been carried out in one vessel sequentially and without separation of the intermediate products. This "one-pot" solution renders the present invention extremely simple to perform.

The method of the invention provides for oligomeric and polymeric compounds which are functionalized with 5-membered cyclic carbonate groups; the polyester group is disposed in the beta position relative to the cyclic carbonate and therefore acts as an electron withdrawing group which serves to increase the reactivity of the 5-membered cyclic carbonate ring. Moreover, the present method provides for the synthesis of functionalized compounds having a wide range of molecular weights: in certain embodiments, the molecular weight and structure of the provided carboxyl functional polyester (Carboxy-PES) will be substantially determinative of the molecular weight and structure the cyclic carbonate functional polyester.

In accordance with a second aspect of the present invention, there is provided a cyclic carbonate functional polyester obtained by the method defined herein above and in the appended claims. Preferably, said cyclic carbonate functional polyester is characterized by at least one of: a cyclic carbonate equivalent weight of 400 to 2500 g/eq., from 500 to 1500 g/eq.; a number average molecular weight (Mn) of from 500 to 5000 g/mol, preferably from 800 to 3000 g/mol; and, an OH value of from 50 to 300 mgKOH/g, preferably from 100 to 200 mgKOH/g.

In accordance with a third aspect of the present invention, there is provided a curable coating, adhesive or sealant composition comprising: a cyclic carbonate functional polyester as defined above; and, at least one multifunctional compound (H) having at least two functional groups (F) selected from the group consisting of: primary amino groups; secondary amino groups; hydroxy groups; phosphine groups; phosphonate groups; and, mercaptan groups.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The terms "preferred", preferably", "desirably", "in particular" and "particularly" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

The molecular weights given in the present text refer to number average molecular weights (Mn), unless otherwise stipulated. All molecular weight data refer to values obtained by gel permeation chromatography (GPC), unless otherwise stipulated.

The "acid value" or "acid number" is a measure of the amount of free acid present in a compound: the acid value is the number of milligrams of potassium hydroxide required for the neutralization of free acid present in one gram of a substance (mg KOH/g). Any measured acid values given herein have been determined in accordance with German Standard DIN 53402.

OH values given herein were obtained following Deutsche (DGF) Einheitsmethoden zur Untersuchung von Fetten, Fettprodukten, Tensiden und verwandten Stoffen (Gesamtinhaltsverzeichnis 2016) C-V 17b (53).

As used herein, room temperature is 23° C. plus or minus 2° C.

As used herein, the term "equivalent (eq.)" relates, as is usual in chemical notation, to the relative number of reactive groups present in the reaction; the term "milliequivalent" (meq) is one thousandth ($10^{-3}$) of a chemical equivalent.

The term "equivalent weight" as used herein refers to the molecular weight divided by the number of a function concerned. As such, "epoxy equivalent weight" (EEW) means the weight of resin, in grams, that contains one equivalent of epoxy.

As used herein, "aliphatic group" means a saturated or unsaturated linear (i.e., straight-chain), branched, cyclic (including bicyclic) organic group: the term "aliphatic group" thus encompasses "alicyclic group", the latter being a cyclic hydrocarbon group having properties resembling those of an aliphatic group. The term "aromatic group" means a mono- or polynuclear aromatic hydrocarbon group.

As used herein, "alkyl group" refers to a monovalent group that is a radical of an alkane and includes straight-chain and branched organic groups, which groups may be substituted or unsubstituted. The term "alkylene group" refers to a divalent group that is a radical of an alkane and includes linear and branched organic groups, which groups may be substituted or substituted.

Specifically, as used herein, "$C_1$-$C_6$ alkyl" group refers to an alkyl group that contains 1 to 6 carbons atoms, Examples of alkyl groups include, but are not limited to: methyl; ethyl; propyl; isopropyl; n-butyl; isobutyl; sec-butyl; tert-butyl; n-pentyl; and, n-hexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl) or 1 or 2 carbon atoms ($C_1$-$C_2$ alkyl)—should be noted.

As used herein, "$C_4$-$C_{20}$ alkenyl" group refers to an aliphatic carbon group that contains 4 to 20 carbon atoms and at least one double bond. Like the aforementioned alkyl group, an alkenyl group can be straight or branched, and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 4 to 18 ($C_{4-18}$) or 4 to 12 ($C_{2-12}$) carbon atoms should be noted. And Examples of $C_4$-$C_{20}$ alkenyl groups include, but are not limited to: 2-butenyl; 4-methylbutenyl; 1-pentenyl, 2-pentenyl, 3-pentenyl, 4-pentenyl, 4-methyl-3-pentenyl, 1-hexenyl, 3-hexenyl, 5-hexenyl, 1-heptenyl, 1-octenyl and n-dodecenyl.

As used herein, "polycarboxylic acid" includes any organic structure with more than one carboxylic acid functional group. Specifically, the term encompasses polymers bearing at least two carboxyl functional groups and thus specifically encompasses: carboxyl-functional polyester resins; carboxyl-functional polyacrylate resins; carboxyl-functional polymethacrylate resins; carboxyl-functional polyamide resins; carboxyl-functional polyimide resins; and, carboxyl-functional polyolefin resins.

As used herein, "polyol" refers to any compound comprising two or more hydroxyl groups. The term thus encompasses diols, triols and compounds containing four or more —OH groups.

The term "epoxide compound" denotes monoepoxide compounds, polyepoxide compounds and epoxide functional prepolymers. The term "polyepoxide compound" is thus intended to denote epoxide compounds having at least two epoxy groups. Further, the term "diepoxide compound" is thus intended to denote epoxide compounds having two epoxy groups.

As used herein, the term "catalytic amount" means a sub-stoichiometric amount of catalyst relative to a reactant.

The term "essentially free" is intended to mean herein that the applicable group, compound, mixture or component constitutes less than 0.1 wt. %, based on the weight of the defined composition.

DETAILED DESCRIPTION OF THE INVENTION

In its broadest expression, the present invention provides a method for preparing a cyclic carbonate functional polyester, said method comprising: reacting glycerine carbonate with an anhydride to form an Adduct (A); and, reacting said Adduct (A) with at least one polyepoxide compound to form said cyclic carbonate functional polyester (CC-PES).

Preparation of Adduct (A)

In the first stage of the above defined process—which may be referred to herein below as Stage A—said glycerine carbonate is reacted with a polyfunctional anhydride. This esterification reaction yields an adduct (A) having a carboxylic acid group, in which adduct the ester group is disposed in the beta (β-) position as will be illustrated herein below.

The reactant glycerine carbonate may be identified alternatively as 4-hydroxymethyl-1,3-dioxolan-2-one. The compound is commercially available as Jeffsol™ manufactured by Huntsman Corporation. Alternatively, the compound can be synthesized by methods known in the art, including: by the reaction of glycerin with a carbonate source such as phosgene, with a dialkyl carbonate or with an alkylene carbonate; by reaction of glycerin with urea, carbon dioxide and oxygen; or, by reaction of carbon dioxide with glycidol. The following documents are instructive on such synthesis methods: U.S. Pat. Nos. 2,915,529; 6,025,504; European Patent No. 1,156,042; and, U.S. Pat. No. 5,359,094.

Whilst there is no particular intention to limit said reactant polyfunctional anhydrides, most suitable are the anhydrides of acids selected from the group consisting of: maleic acid; fumaric acid; citraconic acid; itaconic acid; glutaconic acid; phthalic acid; isophthalic acid (IA); terephthalic acid; cyclohexane dicarboxylic acid; adipic acid; sebacic acid (SeA); azealic acid; malonic acid; succinic acid; alkyl succinic acids; alkenyl succinic acids; glutaric acid; alkyl glutaric acids; alkenyl glutaric acids; and mixtures thereof. The polyfunctional anhydride is preferably an anhydride selected from the group consisting of: maleic anhydride; adipic anhydride; succinic anhydride; alkyl succinic anhydrides; alkenyl succinic anhydrides; glutaric anhydride; alkyl glutaric anhydrides; alkenyl glutaric anhydrides; and, mixtures thereof. More preferably, the polyfunctional anhydride is an anhydride selected from the group consisting of: maleic anhydride; adipic anhydride; succinic anhydride; glutaric anhydride; and, mixtures thereof.

For completeness, the most suitable alkyl succinic anhydrides are those defined by the following general Formula A:

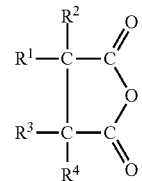

Formula A

In which: $R^1$, $R^2$, $R^3$ and $R^4$ are independently selected from hydrogen and $C_1$-$C_6$ alkyl groups.

The most suitable alkenyl succinic anhydrides are those defined by general Formula B:

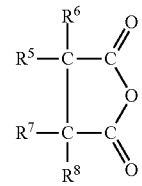

Formula B in which: $R^5$, $R^6$ and $R^7$ are independently selected from hydrogen and $C_1$-$C_6$ alkyl groups; and, $R^8$ is a $C_4$-$C_{20}$ alkenyl group.

By corollary, the most suitable alkyl glutaric anhydrides are those defined by the following general Formula C:

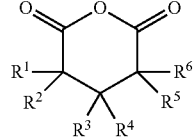

Formula C in which: $R^1$, $R^2$, $R^3$, $R^4$, $R^5$ and $R^6$ are independently selected from hydrogen and $C_1$-$C_6$ alkyl groups.

The most suitable alkenyl glutaric anhydrides are those 3-glutaric derivatives defined by general Formula D:

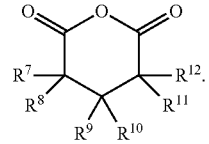

Formula D in which: $R^7$, $R^8$, $R^9$, $R^{11}$ and $R^{12}$ are independently selected from hydrogen and $C_1$-$C_6$ alkyl groups; and, $R^{10}$ is a $C_4$-$C_{20}$ alkenyl group.

The relative amounts of glycerine carbonate to polyfunctional anhydride can vary over a fairly broad range but a significant excess of the anhydride is undesirable because this reactant can be expensive and can be difficult to recover and re-use. Preferably, the anhydride: glycerine carbonate molar ratio is from 2:1 to 0.8:1, more said molar ratio is within the range of 1.2:1 to 0.8:1 and most preferably said ratio is within the range of 1.1:1 to 0.9:1.

The first stage of the present invention may be carried out in any known and suitable vessel which is designed to contain the reactants, products and any solvents employed, including those vessels described in U.S. Pat. No. 4,310,708 (Strege et al.). The materials of the vessel should, of course, be inert under the conditions employed during the process stage.

Having regard to those conditions, this process stage may be performed at any suitable temperature. Whilst the optimum operating temperature for the reaction may be determined by the skilled artisan through experimentation, a suitable temperature range of from 60° to 180° C. may be mentioned, with a preferred temperature range being from 80 to 150° C.

The process pressure is not critical. As such, the reaction can be run at sub-atmospheric, atmospheric, or super-atmospheric pressures but pressures at or above atmospheric pressure are preferred.

Good results have been obtained where the first stage reaction is performed under anhydrous conditions. If desired, exposure to atmospheric moisture may be avoided by providing the reaction vessel with an inert, dry gaseous blanket. Whilst dry nitrogen, helium and argon may be used as blanket gases, precaution should be used when common nitrogen gases are used as a blanket, because such nitrogen may not be dry enough on account of its susceptibility to moisture entrainment; the nitrogen may require an additional drying step before use herein.

The first reaction stage can also be performed in solvent-free conditions and indeed this is desirable. If employed, suitable solvents should be inert: they should contain no functional groups that react with the starting compounds. Mention may thus be made of: aromatic hydrocarbons, illustratively toluene or benzene; aliphatic hydrocarbon solvents having from 5 to 12 carbon atoms, such as heptane, hexane or octane; ethers such as diethyl ether, methyl ethyl ether, diisopropyl ether, dioxane and tetrahydrofuran; and, esters such as ethyl acetate, amyl acetate and methyl formate. Of these solvents, aromatic solvents are least preferred on account of their potential toxic associations.

There is no requirement to employ a catalyst in this reaction step and indeed catalyst-free conditions are desirable. However, the use of catalysts is not precluded and suitable catalysts—including titanium, zirconium and tin catalysts such as titanium, zirconium and tin alcoholates, carboxylates and chelates—are identified in inter alfa: U.S. Pat. No. 3,056,818 (Werber); and, U.S. Pat. No. 5,969,056 (Nava). Further suitable catalysts include alkali or alkaline earth metal acetates, bicarbonates, carbonates, succinates, glutarates, adipates, oxides, hydroxides or mixtures thereof: it is mooted that sodium carbonate, potassium carbonate, sodium acetate, and potassium acetate are preferable as they are inexpensive, readily available, and effective. When used, the amount of catalyst is preferably from 0.05 to 5 wt. % or from 0.05 to 3 wt. %, based on the total amount of reacting compounds.

The reaction time to obtain adequate conversion of reactant anhydride will be dependent on various factors such as temperature, catalyst type and type of polyfunctional anhydride. The reaction can be monitored by analyzing the acid value (Av) of the reactant mixture over time and the reaction stopped when that determined acid value is constant at a value close to the theoretical acid value. Generally, the time which is sufficient for the reaction to take place will be from 2 to 20 hours, for instance from 4 to 8 hours or from 4 to 7 hours.

Having regard to the preferred embodiments of the anhydride reaction, an illustrative reaction scheme for the first step of the claimed process is as follows, wherein n is 1, 2 or 3:

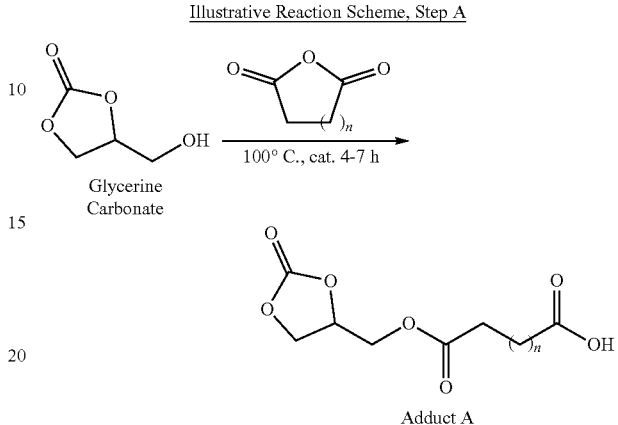

Illustrative Reaction Scheme, Step A

Glycerine Carbonate

Adduct A

Adduct (A) produced in accordance with the first step of the present invention may be used as is or may be isolated and purified using methods known in the art: mention in this regard may be made of extraction, evaporation, distillation and chromatography.

Reacting said Adduct (A) with at Least One Polyepoxide Compound

The derived adduct (A) is reacted with at least one polyepoxide compound to form said cyclic carbonate functional polyester (CC-PES). Irrespective of the choice of polyepoxide compound, this reaction should be characterized in that the equivalence ratio of the carboxyl groups to the epoxy groups is at least 1:1 and is preferably in the range from (1.0-1.2):1 or from (1.0-1.1):1.

Whilst there is an acknowledged preference for selecting an epoxy functional polyester (Epoxy-PES)—derivable from stages B) and C) as described herein below—as the reactant, other polyepoxides may be used either alone or in combination with said epoxy functional polyester in this stage of the reaction.

Such suitable other polyepoxide compounds may be liquid, solid or in solution in solvent. Further, such polyepoxide compounds should have an epoxy equivalent weight of from 100 to 700 g/eq, for example from 120 to 320 g/eq. And generally, diepoxide compounds having epoxy equivalent weights of less than 500 or even less than 400 are preferred: this is predominantly from a costs standpoint, as in their production, lower molecular weight epoxy resins require more limited processing in purification.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid C1-C18 alkyl esters;

butadiene diepoxide; polybutadiene diglycidyl ether; vinyl-cyclohexene diepoxide; and, limonene diepoxide.

Illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

Without intention to limit the present invention, examples of highly preferred polyepoxide compounds include: bisphenol-A epoxy resins, such as DER™ 331, and DER™ 383; bisphenol-F epoxy resins, such as DER™ 354; bisphenol-A/F epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; and, brominated epoxy resins such as DER™ 542.

Although the reaction of an epoxy group with a carboxyl group can proceed in the absence of a catalyst, basic catalysis is required here both to achieve acceptable reaction rates and the desired reaction product. Examples of suitable basic catalysts include but are not limited to: alkaline metal hydroxides, such as lithium hydroxide, sodium hydroxide, and potassium hydroxide; alkaline earth metal hydroxides, such as calcium hydroxide and magnesium hydroxide; alkali metal carbonates, such as sodium carbonate and potassium carbonate; sodium alcoholates, such as sodium methylate, sodium ethylate, and sodium butylate; quaternary ammonium hydroxides, such as benzyltrimethylammonium hydroxide and tetrabutylammonium hydroxide; ammonium salts as phase transfer catalysts, such as benzyltrimethylammonium chloride, benzyltriethylammonium chloride, methyltricaprylammonium chloride, methyltributylammonium chloride, methyltrioctylammonium chloride and tetra-n-octylammonium bromide; phosphonium salts as phase transfer catalysts, such as hexadecyltributylphosphonium bromide, tetramethylphosphonium bromide, tetraphenylphosphonium bromide, tetraphenylphosphonium chloride and trihexyltetradecylphosphonium bromide; and, strong basic ion-exchange resins. Whilst the skilled artisan can determine appropriate and optimum catalytic amounts of such compounds, it is submitted that the typical amount of catalyst is from 0.05 to 5 wt. % or from 0.05 to 3 wt. %, based on the total amount of reacting compounds.

Whilst the optimum operating temperature for this stage of the process may be determined by the skilled artisan through experimentation, a suitable temperature range of from 40° to 180° C. may be mentioned, with a preferred temperature range being from 60° to 170° C. or even 160° C. The process pressure is not critical: as such, the reaction can be run at sub-atmospheric, atmospheric, or super-atmospheric pressures but pressures at or above atmospheric pressure are preferred.

Good results have been obtained where this stage is performed under anhydrous conditions, wherein the reaction vessel has been provided with an inert, dry gaseous blanket of, for instance, dry nitrogen, helium or argon. It is also noted that this reaction stage should also desirably be performed in solvent-free conditions. If employed, suitable solvents should be inert: they should contain no reactive groups that react with the starting compounds.

The progress of the reaction can be monitored by analyzing the acid value (Av) of the reactant mixture over time: the reaction may be stopped when that determined acid value is at a value of less than 1 mg KOH/g. Generally, the time which is sufficient for the reaction to reach that point will be from 0.5 to 20 hours, for instance from 1 to 8 hours or from 2 to 6 hours.

The reaction product (CC-PES) may be separated and purified using methods known in the art: mention in this regard may be made again of extraction, evaporation, distillation and chromatography. Where it is intended that the cyclic carbonate functional polyesters (CC-PES) be stored upon production, the polyesters should be disposed in a vessel with an airtight and moisture-tight seal.

Detailed Description of a Mode of the Invention

In an important embodiment, the method of preparing the cyclic carbonate functional polyester comprises the stages: A) reacting glycerine carbonate with an anhydride to form an Adduct (A), as described herein above; B) providing a polycarboxylic acid; C) reacting said polycarboxylic acid with at least one diglycidyl ether to form an epoxy functional polyester; and, D) reacting said epoxy functional polyester with said Adduct (A) to form said cyclic carbonate functional polyester.

It is noted that the reaction stages B to D may be independently performed in one or more suitable vessels. In this instance, the intermediate reaction products formed after stages B and C respectively may be isolated and/or purified using methods known in the art, such as extraction, evaporation, distillation and chromatography. This methodology is not however preferred. Desirably, the stages B to D are carried out in one vessel sequentially; this "one-pot" solution obviates the need for intermediate separation and purification steps. Moreover, it is preferred that Stages B to D are each performed under conditions which are essentially free of solvent.

Stage B

Stage B of this mode of the invention consists of providing a polycarboxylic acid. In general, any polycarboxylic acid in which the carboxylic acid groups are separated by a bivalent hydrocarbon group which may be saturated or unsaturated, aliphatic, aromatic or cycloaliphatic or which may have two or more aliphatic, aromatic or cycloaliphatic moieties, can be used. A preference for dicarboxylic acids and tricarboxylic acids might be mentioned, with the former being particularly preferred. Moreover, preferred polycarboxylic acids should generally be characterized by an acid value (Av) of from 50 to 1200 mgKOH/g, for example from 80 to 1100 mgKOH/g.

Exemplary suitable dicarboxylic acids include: phthalic acid; isophthalic acid (IA); terephthalic acid; orthophthalic acid; naphthalene dicarboxylic acid; 1,3- and 1,4-cyclohexane dicarboxylic acid; p-phenylene diacetic acid; sebacic acid (SeA); brassylic acid; maleic acid; fumaric acid; oxalic acid; succinic acid; itaconic acid; adipic acid; beta-methyl adipic acid; trimethyl adipic acid, glutaric acid; azelaic; malonic; suberic acid; pimelic acid; dodecanedioic acid; dimer fatty acid; and, mixtures thereof.

Exemplary suitable tricarboxylic acids include: citric acid; aconitic acid; 1,3,5-pentanetricarboxylic acid; 1,2,3-propanetricarboxylic acid; 1,2,3,4-butanetetracarboxylic acid; 1,2,4-benzenetricarboxylic; and, 1,3,5-benzenetricarboxylic.

In a particularly preferred embodiment of the invention, the polycarboxylic acid of Stage B is a carboxyl functional polyester (Carboxy-PES), which polymer may preferably be characterized by an acid value (Av) of from 50 to 500 mgKOH/g, preferably from 80 to 430 mgKOH/g.

The carboxyl functional polyesters (Carboxy-PES) of this embodiment are obtainable by the reaction of: i) at least one aromatic, aliphatic or cycloaliphatic dicarboxylic acid or the anhydride thereof; ii) at least one diol compound, more particularly a compound having two aliphatic hydroxyl groups which may each independently be a primary or a secondary hydroxyl group.

Suitable dicarboxylic acids include saturated, unsaturated, aliphatic, cycloaliphatic or aromatic dicarboxylic acids and/or anhydrides. Exemplary dicarboxylic acids are: phthalic acid; isophthalic acid; terephthalic acid; orthophthalic acid; naphthalene dicarboxylic acid; 1,3- and 1,4-cyclohexane dicarboxylic acid; p-phenylene diacetic acid; sebacic acid; brassylic acid; maleic acid; fumaric acid; succinic acid; itaconic acid; adipic acid; beta-methyl adipic acid; trimethyl adipic acid, glutaric acid; azelaic; malonic; suberic acid; dodecanedioic acid; and, mixtures thereof. Preferably, the dicarboxylic acids or anhydrides of dicarboxylic acids will have from 4 to 12 carbon atoms.

Suitable diols having two aliphatic hydroxyl groups may have a molecular weight of 62 to 5000 and may optionally contain ether groups, ester groups and/or carbonate groups. Exemplary aliphatic diols are: ethylene glycol; 1,2-propanediol; 2-methyl-1,3-propanediol; 1,3- and 1,4-butanediol; 1,6-hexanediol; diethylene glycol; dipropylene glycol; neopentyl glycol; triethylene glycol; tetraethylene glycol; tripropylene glycol; tetrapropylene glycol; polycarbonate diols; polyester diols; dimeric fatty alcohols; and, mixtures thereof.

The use of further reactants in the derivation of the carboxyl functional polyesters (Carboxy-PES) is not precluded and mention in this regard may be made of: iii) dihydroxymonocarboxylic acids in which each hydroxyl group may independently be primary or secondary hydroxyl; iv) trifunctional and/or tetrafunctional hydroxy compounds, comprising respectively three four aliphatic hydroxyl groups which may each independently be a primary or secondary hydroxyl group, such as trimethylolethane, trimethylolpropane, hexanetriol or pentaerythritol.

It will be apparent to a person of ordinary skill in the art that there are a plurality of alternative ways in which to synthesize carboxyl functional polyesters (Carboxy-PES) from said reactants and, as such, there is no intention to limit the present invention to a single one of those ways. However, certain preferred synthesis methods will be discussed herein below.

In a first method, a hydroxyl functional polyester may be reacted with carboxylic acids or their anhydrides to form the carboxyl functional polyester. This first method may be constituted by a two stage process: in the first stage, a dicarboxylic acid and a diol are reacted to form a hydroxyl-functional pre-polymer, under conditions for water removal; in the second stage, that pre-polymer is reacted with carboxylic acids or their anhydrides. The conditions for water removal will typically be constituted by one or more of: a temperature of from 120° to 250° C.; the application of a vacuum; and, the use of solvents to facilitate azeotropic distillation.

The amount of acid or anhydride reagent used is determined by the hydroxyl number of the polyester or intermediate pre-polymer in the case of the two stage process, which hydroxyl number is desirably from 50 to 300 mgKOH/g and preferably from 80 to 150 mgKOH/g. Generally from 80 to 100% of the stoichiometric amount required to cap all of the hydroxyl functional groups of the polyester is generally added. The reagent is added to the hydroxyl functional polyester or pre-polymer and the esterification is continued until a desired acid number (Av) is obtained. Usually, the total reaction time will be from 5 to 15 hours.

A conventional catalyst for the promotion of an esterification reaction can be employed in the (end-capping) reaction and, if applicable, in one or both of the first and second stages. Catalysts, which may be used in an amount of from 0.01 to 1 wt. %, for example from 0.01 to 0.5 wt. %, based on the combined weight of the reactants, will typically be compounds of tin, antimony, titanium or zirconium. Mention in this regard may be made of: titanium alkoxides and derivatives thereof, such as tetraethyl titanate, tetra isopropyl titanate (TIPT), tetra n-propyl titanate, tetra n-butyl titanate, tetra(2-ethylhexyl) titanate, isopropyl butyl titanate, tetrastearyl titanate, diisopropoxy-bis(acetylacetonato) titanium, di-n-butoxy-bis(triethanolaminoato)titanium, tributyl monoacetyltitanate triisopropyl monoacetyltitanate and tetrabenzoic acid titanate; titanium complex salts, such as alkali titanium oxalates and malonates, potassium hexafluorotitanate and titanium complexes with hydroxycarboxylic acids such as tartaric acid, citric acid or lactic acid; titanium dioxide/silicon dioxide co-precipitates; hydrated alkaline-containing titanium dioxide; and, the corresponding zirconium compounds.

In accordance with a second desired method of synthesizing the carboxyl functional polyesters (Carboxy-PES), a stoichiometric excess of the dicarboxylic acid is reacted with at least one diol in the presence of a catalytic amount of an esterification catalyst, such as those mentioned above. The stoichiometric excess of dicarboxylic acid should be sufficient to achieve the desired ester linkages and to have additional carboxyl groups to yield the terminal carboxyl groups. Further, such a polycondensation reaction should be performed under conditions for water removal.

Stage C

In this stage of the process of the present invention, the polycarboxylic acids—where applicable being carboxyl functional polyesters (Carboxy-PES)—are reacted with one or more diglycidyl ether compounds to yield an epoxy functional polyester (Epoxy-PES). Broadly, suitable diglycidyl ether compounds may be liquid, solid or in solution in solvent. Said diglycidyl ether compounds may be aromatic, aliphatic or cycloaliphatic in nature and, as such, can be derivable from dihydric phenols and dihydric alcohols. And useful classes of such diglycidyl ethers (epoxy resins) are: diglycidyl ethers of aliphatic and cycloaliphatic diols, such as 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; polyalkyleneglycol based diglycidyl ethers, in particular polypropyleneglycol diglycidyl ethers; and, polycarbonatediol based glycidyl ethers.

It is preferred that the diglycidyl ethers compounds have an epoxy equivalent weight of from 100 to 700 g/eq, for example from 120 to 320 g/eq. Generally, diglycidyl ethers compounds having epoxy equivalent weights of less than 500 or even less than 400 are preferred: this is predominantly from a costs standpoint, as in their production, lower molecular weight epoxy resins require more limited processing in purification.

Without intention to limit the present invention, examples of suitable epoxy resins include: bisphenol-A epoxy resins, such as DER™ 331, and DER™ 383; bisphenol-F epoxy resins, such as DER™ 354; bisphenol-A/F epoxy resin blends, such as DER™ 353; aliphatic glycidyl ethers, such as DER™ 736; polypropylene glycol diglycidyl ethers, such as DER™ 732; solid bisphenol-A epoxy resins, such as DER™ 661 and DER™ 664 UE; solutions of bisphenol-A solid epoxy resins, such as DER™ 671-X75; epoxy novolac resins, such as DEN™ 438; and, brominated epoxy resins such as DER™ 542.

The molar ratio of the diglycidyl ether compounds to the carboxyl functional polyesters (Carboxy-PES) should be from 1.5:1 to 3:1 and more preferably from 1.8:1 to 2.2:1.

Although the reaction of an epoxy group with a carboxyl group can proceed in the absence of a catalyst, basic catalysis is required here both to achieve acceptable reaction rates and an acceptable yield of the desired reaction product. Examples of suitable basic catalysts for Stage C include but are not limited to: alkaline metal hydroxides, such as lithium hydroxide, sodium hydroxide, and potassium hydroxide; alkaline earth metal hydroxides, such as calcium hydroxide and magnesium hydroxide; alkali metal carbonates, such as sodium carbonate and potassium carbonate; sodium alcoholates, such as sodium methylate, sodium ethylate, and sodium butylate; quaternary ammonium hydroxides, such as benzyltrimethylammonium hydroxide and tetrabutylammonium hydroxide; ammonium salts as phase transfer catalysts, such as benzyltrimethylammonium chloride, benzyltriethylammonium chloride, methyltricaprylammonium chloride, methyltributylammonium chloride, methyltrioctylammonium chloride and tetra-n-octylammonium bromide; phosphonium salts as phase transfer catalysts, such as hexadecyltributylphosphonium bromide, tetramethylphosphonium bromide, tetraphenylphosphonium bromide, tetraphenylphosphonium chloride and trihexyltetradecylphosphonium bromide; and, strong basic ion-exchange resins. Whilst the skilled artisan can determine appropriate and optimum catalytic amounts of such compounds, it is submitted that the typical amount of catalyst is from 0.05 to 5 wt. % or from 0.05 to 3 wt. %, based on the total amount of reacting compounds.

Whilst the optimum operating temperature for Stage C of the process may be determined by the skilled artisan through experimentation, a suitable temperature range of from 40° to 180° C. may be mentioned, with a preferred temperature range being from 60° to 170° C. or even 160° C. The process pressure is not critical: as such, the reaction can be run at sub-atmospheric, atmospheric, or super-atmospheric pressures but pressures at or above atmospheric pressure are preferred.

Good results have been obtained where this stage is performed under anhydrous conditions, wherein the reaction vessel has been provided with an inert, dry gaseous blanket of, for instance, dry nitrogen, helium or argon. It is also noted that this reaction stage should also desirably be performed in solvent-free conditions. If employed, suitable solvents should be inert: they should contain no reactive groups that react with the starting compounds.

The progress of the epoxidation reaction can be monitored by analyzing the acid value (Av) of the reactant mixture over time: the reaction may be stopped when that determined acid value is at a value of less than 1 mg KOH/g. Generally, the time which is sufficient for the epoxidation reaction to take place will be from 0.5 to 20 hours, for instance from 1 to 8 hours or from 2 to 6 hours.

Having regard to the preferred embodiments of the epoxidation reaction, an illustrative reaction scheme for the first step of the claimed process is as follows:

Illustrative Reaction Scheme, Stage C

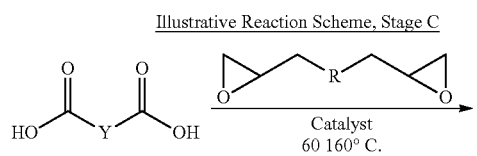

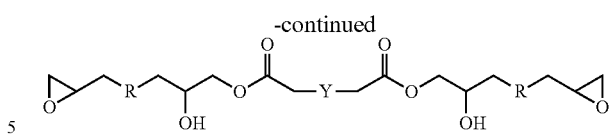

in which: R is the residue of a dihydric phenol or dihydric alcohol; and, Y is a polyester (PES) or the residue of a polycarboxylic acid.

Stage D

In this stage of the process, the Adduct (A) of Stage A is reacted with the epoxy functional polyester (Epoxy-PES) obtained from Stage C. Through this reaction, a polyester having terminal cyclic carbonate groups (CC-PES) is obtained.

The adduct should be added to the reaction medium in an amount sufficient to ensure that there is at least a 1:1 equivalent ratio of carboxylic acid groups to epoxy groups. This may equate to a molar ratio of the Adduct (A) to the epoxy functional polyester (Epoxy-PES) being in the range from 2:1 to 3:1 and more preferably from 2:1 to 2.5:1.

Although the reaction of an epoxy group with a carboxyl group can proceed in the absence of a catalyst, basic catalysis is required here both to achieve acceptable reaction rates and the desired reaction product. Examples of suitable basic catalysts for Stage D include but are not limited to: alkaline metal hydroxides, such as lithium hydroxide, sodium hydroxide, and potassium hydroxide; alkaline earth metal hydroxides, such as calcium hydroxide and magnesium hydroxide; alkali metal carbonates, such as sodium carbonate and potassium carbonate; sodium alcoholates, such as sodium methylate, sodium ethylate, and sodium butylate; quaternary ammonium hydroxides, such as benzyltrimethylammonium hydroxide and tetrabutylammonium hydroxide; ammonium salts as phase transfer catalysts, such as benzyltrimethylammonium chloride, benzyltriethylammonium chloride, methyltricaprylammonium chloride, methyltributylammonium chloride, methyltrioctylammonium chloride and tetra-n-octylammonium bromide; phosphonium salts as phase transfer catalysts, such as hexadecyltributylphosphonium bromide, tetramethylphosphonium bromide, tetraphenylphosphonium bromide, tetraphenylphosphonium chloride and trihexyltetradecylphosphonium bromide; and, strong basic ion-exchange resins. Whilst the skilled artisan can determine appropriate and optimum catalytic amounts of such compounds, it is submitted that the typical amount of catalyst is from 0.05 to 5 wt. % or from 0.05 to 3 wt. %, based on the total amount of reacting compounds.

Whilst the optimum operating temperature for stage D of the process may be determined by the skilled artisan through experimentation, a suitable temperature range of from 40° to 180° C. may be mentioned, with a preferred temperature range being from 60° to 170° C. or even 160° C. The process pressure is not critical: as such, the reaction can be run at sub-atmospheric, atmospheric, or super-atmospheric pressures but pressures at or above atmospheric pressure are preferred.

Good results have been obtained where this stage is performed under anhydrous conditions, wherein the reaction vessel has been provided with an inert, dry gaseous blanket of, for instance, dry nitrogen, helium or argon. It is also noted that this reaction stage should also desirably be performed in solvent-free conditions. If employed, suitable solvents should be inert: they should contain no reactive groups that react with the starting compounds.

The progress of the reaction can be monitored by analyzing the acid value (Av) of the reactant mixture over time: the reaction may be stopped when that determined acid value is at a value of less than 1 mg KOH/g. Generally, the time which is sufficient for the reaction to reach that point will be from 0.5 to 20 hours, for instance from 1 to 8 hours or from 2 to 6 hours.

Having regard to its preferred embodiments, an illustrative reaction scheme for this step of the claimed process is as follows:

Illustrative Reaction Scheme, Stage D

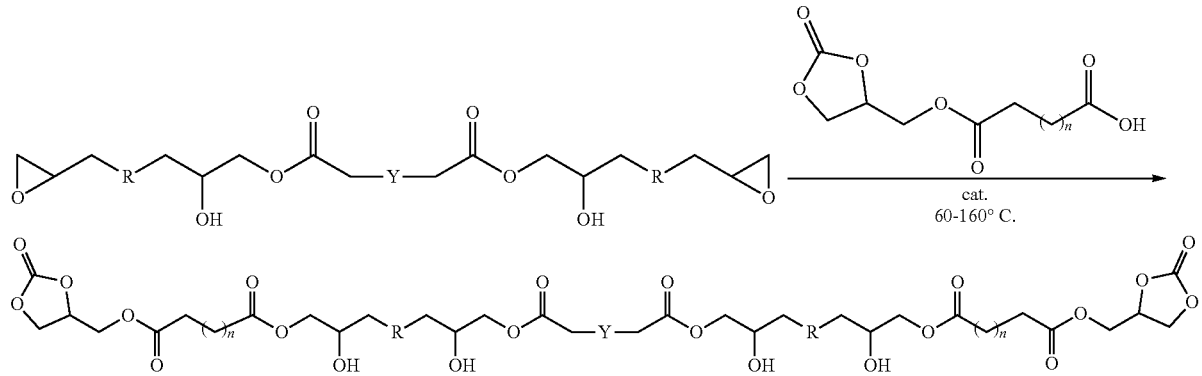

in which: R is the residue of a dihydric phenol or dihydric alcohol; Y is a polyester (PES) or the residue of a polycarboxylic acid; and, n is 1, 2 or 3.

The product of stage D (CC-PES) may be separated and purified using methods known in the art: mention in this regard may be made again of extraction, evaporation, distillation and chromatography.

Where it is intended that the cyclic carbonate functional polyesters (CC-PES) be stored upon production, the polyesters should be disposed in a vessel with an airtight and moisture-tight seal.

Coating, Sealant and Adhesive Compositions

As mentioned hereinbefore, the cyclic carbonate functional polyesters (CC-PES) obtained using the process of the present invention can be employed as a reactive component of a curable coating, adhesive or sealant composition. The further reactant(s) of such compositions will generally be one or more multifunctional compounds (H) having at least two functional groups (F) selected from the group consisting of: primary amino groups; secondary amino groups; hydroxy groups; phosphine groups; phosphonate groups; and, mercaptan groups. Latent compounds, in which the functional groups (F) are blocked but which are activatable under specific physicochemical conditions, are also envisaged as suitable further reactants for the coating, adhesive or sealant compositions.

No particular limitation is imposed on the number of functional groups (F) possessed by the (activated) compound (H): compounds having 2, 3, 4, 5, 6, 7, 8, 9 or 10 functional groups may be used, for instance. Moreover, the reactant compound (H) can be a low-molecular-weight substance—that is its molecular weight is less than 500 g/mol—or an oligomeric or polymeric substance that has a number average molecular weight (Mn) above 500 g/mol. And, of course, mixtures of compounds (H)—for instance mixtures of alcoholic and amine hardeners—may be used.

In an important embodiment, the functional groups (F) of the compounds (H) are selected from the group consisting of: aliphatic hydroxyl groups; aliphatic primary amino groups; aliphatic secondary amino groups; aliphatic phosphine groups; aliphatic phosphonate groups; aliphatic mercaptan groups; and, mixtures thereof.

In a preferred embodiment, the compound (H) comprises or consists of an amine (or aminic) or an alcoholic compound and, more particularly, the functional groups (F) of the compound (H) are selected from the group consisting of: aliphatic hydroxyl groups; aliphatic primary amino groups; aliphatic secondary amino groups; and, combinations thereof.

Without intention to limit the present invention, exemplary aminic compounds (H) suitable for inclusion in curable compositions containing the cyclic carbonate functional polyesters (CC-PES) are:

a) aliphatic polyamines, such as ethylenediamine, 1,2- and 1,3-propanediamine, neopentanediamine, hexamethylenediamine, octamethylenediamine, 1,10-diaminodecane, 1,12-diaminododecane, diethylenetriamine, triethylenetetramine, tetraethylenepentamine, 2,2-dimethylpropylenediamine, trimethylhexamethylenediamine, 1-(3-aminopropyl)-3-aminopropane, 1,3-bis(3-aminopropyl)propane, and 4-ethyl-4-methylamino-1-octylamine;

b) cycloaliphatic diamines such as 1,2-diaminocyclohexane, 1,2-, 1,3- and 1,4-bis(aminomethyl)cyclohexane, 1-methyl-2,4-diaminocyclohexane, N-cyclohexylpropylene-1,3-diamine, 4-(2-aminopropan-2-yl)-1-methylcyclohexan-1-amine, isophorone diamine, 4,4'-diaminodicyclohexylmethane (Dicykan), 3,3'-dimethyl-4,4'-diaminodicyclohexylmethane, 3,3',5,5'-tetramethyl-4,4'-diaminodicyclohexylmethane, 4,8-diaminotricyclo[5.2.1.0] decane, norbornane diamine, menthanediamine and menthenediamine;

c) aromatic diamines such as toluylenediamine, xylylenediamine, in particular meta-xylylenediamine (MXDA), bis(4-aminophenyl)methane (MDA or methylenedianiline), and bis(4-aminophenyl)sulfone (also known as DADS, DDS, or Dapsone);

d) cyclic polyamines such as piperazine and N-aminoethylpiperazine;

e) polyetheramines, in particular difunctional and trifunctional primary polyetheramines based on polypropylene glycol, polyethylene glycol, polybutylene oxide, poly(1,4-butanediol), polytetrahydrofuran (PolyTHF) or polypentylene oxide;

f) polyamidoamines (amidopolyamines) which can be obtained by reacting dimeric fatty acids (e.g., dimeric linoleic acid) with low-molecular-weight polyamines such as diethylenetriamine, 1-(3-aminopropyl)-3-aminopropane or triethylenetetramine, or with other diamines, such as the aforementioned aliphatic or cycloaliphatic diamines;

g) adducts obtainable by reacting amines, in particular diamines, with a deficit of epoxy resin or reactive diluent, preferably such adducts being used where about 5 to 20% of the epoxy groups have been reacted with amines, in particular diamines;

h) phenalkamines, as are known from epoxide chemistry; and, i) Mannich bases which may typically be prepared by condensation of polyamines, preferably diethylenetriamine, triethylenetetramine, isophorone diamine, 2,2,4- or 2,4,4-trimethylhexamethylenediamine, 1,3- and 1,4-bis(aminomethyl)cyclohexane with aldehydes, preferably formaldehyde and mono- or polyhydric phenols having at least one aldehyde-reactive core site, e.g., the various cresols and xylenols, p-tert-butylphenol, resorcinol, 4,4'-dihydroxydiphenylmethane, 4,4'-dihydroxydiphenyl-2,2-propane, but preferably phenol.

Alcoholic hardeners crosslink to form carbonate polymers by reaction of the primary or secondary alcohol functions with the 1,3-dioxolan-2-one groups with the formation of carbonic acid diesters. As such, preferred alcoholic hardeners for use in the present invention have on average at least two primary or secondary hydroxy groups per molecule; alcoholic hardeners having two, three or four primary or secondary hydroxy groups per molecule might be mentioned in this regard.

Broadly, the alcoholic compounds (H) may primarily be selected from low-molecular-weight and higher-molecular-weight aliphatic and cycloaliphatic alcohols. Without intention to limit the present invention, exemplary low-molecular-weight alcoholic compounds (H) suitable for inclusion in curable compositions containing the cyclic carbonate functional polyesters (CC-PES) are: 1,4-butanediol; ethylene glycol; diethylene glycol; triethylene glycol; neopentyl glycol; 1,3-propanediol; 1,5-pentanediol; 1,6-hexanediol; glycerol; diglycerol; pentaerythritol; dipentaerythritol; and, sugar alcohols such as sorbitol and mannitol. Exemplary higher-molecular-weight polymeric polyols include but are not limited to: polyester polyols; polycarbonate polyols; polyether polyols; polyacrylate polyols; and, polyvinyl alcohols. These polymeric polyol compounds (H) should typically be characterized by one or more of the following properties: i) an average OH functionality of at least 1.5 mol and preferably at least 1.8, for instance an OH functionality in the range from 1.5 to 10 or 1.8 to 4, wherein said average OH functionality is understood to be the average number of OH groups per polymer chain; ii) a number average molecular weight (Mn) of from 250 to 50,000 g/mol, preferably from 500 to 10,000 g/mol; and, iii) having at least 50 mole % of the hydroxyl groups contained in the polymeric polyol component being primary hydroxyl groups.

The total amount of compounds (H) present in the curable composition is preferably selected so that the molar ratio of 1,3-dioxolan-2-one groups of said functional polyesters (CC-PES) to the functional groups (F) is in the range of from 1:10 to 10:1, for example from 5:1 to 1:5, and is preferably in the range of from 1:2 to 2:1.

In an alternative expression of the composition, the total amount of compounds (H) is suitably from 0.1-50 wt. %, preferably from 0.5 to 40 wt. % and more preferably 1 to 30 wt. %, based on the combined total amount of the cyclic carbonate functional polyesters (CC-PES) and the compounds (H).

As is standard in the art, the curable composition may comprise additives and adjunct ingredients. Suitable additives and adjunct ingredients include: catalysts; antioxidants; UV absorbers/light stabilizers; metal deactivators; antistatic agents; reinforcers; fillers; antifogging agents; propellants; biocides; plasticizers; lubricants; emulsifiers; dyes; pigments; rheological agents; impact modifiers; adhesion regulators; optical brighteners; flame retardants; anti-drip agents; nucleating agents; wetting agents; thickeners; protective colloids; defoamers; tackifiers; solvents; reactive diluents; and, mixtures thereof. The selection of suitable conventional additives for the composition depends on the specific intended use thereof and can be determined in the individual case by the skilled artisan.

In certain embodiments of the invention, no catalysts will be required to catalyze the reaction of the cyclic carbonate groups with the functional groups (F) of the compound (H): this may typically be the case where primary and secondary amino groups are present as the functional groups (F). However, in other cases and preferably where the compound (H) has reactive groups F that are different from amino groups, a catalyst may be required: suitable catalysts for the hardening will then be determined in a known manner dependent upon the type of the reactive functional groups (F). The catalysts, when desired, are used in an amount of from 0.01 to 10 wt. %, preferably from 0.01 to 5 wt. %, based on the total weight of the curable composition.

Basic catalysts, and in particular organic amines and organic phosphines, represent an important class of catalysts in the present invention. Preferred among the organic amines are: amidine bases, such as 1,8-diazabicyclo[5.4.0]undec-7-ene (DBU) and 1,5-diazabicyclo[4.3.0]non-5-ene (DBN); mono-$C_1$-$C_6$-alkylamines; di-$C_1$-$C_6$-alkylamines; and, tri-$C_1$-$C_6$-alkylamines, in particular triethylamine and tert-butylamine. Preferred among the organic phosphines are: trialkylphosphines, such as tri-n-butylphosphine; and, triarylphosphines such as triphenylphosphine. Of course, such basic catalysts can also be used as mixtures, optionally in combination with tri-$C_1$-$C_6$-alkylammonium halides and copper salts; as an example, the combination of triphenylphosphine with a tri-$C_1$-$C_6$-alkylammonium halide and a copper salt—such as copper(I) chloride, copper(I) bromide, copper(II) chloride, or copper(II) sulfate—may be mentioned.

The curable coating, adhesive or sealant composition should comprise less than 5 wt. % of water, based on the weight of the composition, and is most preferably an anhydrous composition that is essentially free of water. These embodiments do not preclude the composition from either comprising organic solvent or being essentially free of organic solvent.

Broadly, all organic solvents known to the person skilled in the art can be used as a solvent but it is preferred that said organic solvents are selected from the group consisting of: esters; ketones; halogenated hydrocarbons; alkanes; alkenes; and, aromatic hydrocarbons. Exemplary solvents are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran or tetrachloroethylene or mixtures of two or more of the recited solvents.

Methods and Applications

To form a coating, sealant or adhesive composition, the reactive compounds are brought together and mixed in such a manner as to induce the hardening of the binder. More particularly, the cyclic carbonate functional polyesters (CC-PES) and the compounds (H) may be mixed in pre-determined amounts by hand, by machine, by (co-)extrusion or by any other means which can ensure fine and highly homogeneous mixing thereof.

The hardening of the binder compositions of the invention typically occurs at temperatures in the range of from −10° C. to 150° C., preferably from 0° C. to 100° C., and in particular from 10° C. to 70° C. The temperature that is suitable depends on the specific compounds (H) and the desired hardening rate and can be determined in the individual case by the skilled artisan, using simple preliminary tests if necessary. Of course, hardening at temperatures of from 5° C. to 35° C. or from 20° C. to 30° C. is especially advantageous as it obviates the requirement to substantially heat or cool the mixture from the usually prevailing ambient temperature. Where applicable, however, the temperature of the mixture of the cyclic carbonate functional polyesters (CC-PES) and the compounds (H) may be raised above the mixing temperature using conventional means, including microwave induction.

The compositions according to the invention may find utility inter alia in: varnishes; inks; elastomers; foams; binding agents for fibers and/or particles; the coating of glass; the coating of mineral building materials, such as lime- and/or cement-bonded plasters, gypsum-containing surfaces, fiber cement building materials and concrete; the coating and sealing of wood and wooden materials, such as chipboard, fiber board and paper; the coating of metallic surfaces; the coating of asphalt- and bitumen-containing pavements; the coating and sealing of various plastic surfaces; and, the coating of leather and textiles.

It is also considered that the compositions of the present invention are suitable as pourable sealing compounds for electrical building components such as cables, fiber optics, cover strips or plugs. The sealants may serve to protect those components against the ingress of water and other contaminants, against heat exposure, temperature fluctuation and thermal shock, and against mechanical damage.

By virtue of the fact that the compositions of the present invention are capable of creating a high binding strength in a short time, often at room temperature—particularly where amine hardeners (H) are employed—the compositions are optimally used for forming composite structures by surface-to-surface bonding of the same or different materials to one another. The binding together of wood and wooden materials and the binding together of metallic materials may be mentioned as exemplary adhesive applications of the present compositions.

In a particularly preferred embodiment of the invention, the curable compositions are used as solvent-free or solvent-containing lamination adhesives for gluing plastic and polymeric films, such as polyolefin films, poly(methylmethacrylate) films, polycarbonate films and Acrylonitrile Butadiene Styrene (ABS) films.

In each of the above described applications, the compositions may be applied by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray. For coating and adhesive applications, it is recommended that the compositions be applied to a wet film thickness of from 10 to 500 µm. The application of thinner layers within this range is more economical and provides for a reduced likelihood of thick cured regions that may—for coating applications—require sanding. However, great control must be exercised in applying thinner coatings or layers so as to avoid the formation of discontinuous cured films.

Various features and embodiments of the disclosure are described in the following examples, which are intended to be representative and not limiting.

EXAMPLES

The following materials are employed in the Examples:

DER 732: Liquid Epoxy Resin, a reaction product of epichlorohydrin and polypropylene glycol; available from The Dow Chemical Company.

DER 331: Liquid Epoxy Resin, a reaction product of epichlorohydrin and bisphenol A; available from The Dow Chemical Company.

TIPT: Tetra Isopropyl Titanate, available from Connect Chemicals.

ERISYS™ GE-35H: Castor Oil Triglycidyl Ether, available from CVC Thermoset Specialties.

Jeffamine EDR-176: Polyether diamine having a weight average molecular weight (Mw) of 176 g/mol, available from Huntsman Corporation.

PEI: Polyethylenimine having a weight average molecular weight (Mw) of 800 g/mol, available from Sigma-Aldrich.

Example 1: Reaction between Glycerine Carbonate and Glutaric Anhydride (GC-Glut)

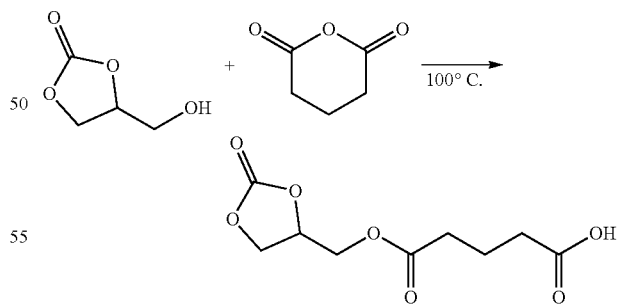

Glycerine carbonate (254 g) and glutaric anhydride (251 g) were stirred in a round bottom flask at 100° C., under $N_2$ atmosphere. The 100% conversion—or, specifically, the addition of glycerine carbonate to glutaric anhydride—was observed after 9 hours, when the determined acid value (Av) was constant at a value close to the theoretical one (theoretical Av=242 mg KOH/g; experimental Av=252 mg KOH/g).

Example 2: Reaction between Glycerine Carbonate and Succinic Anhydride (GC-Succ)

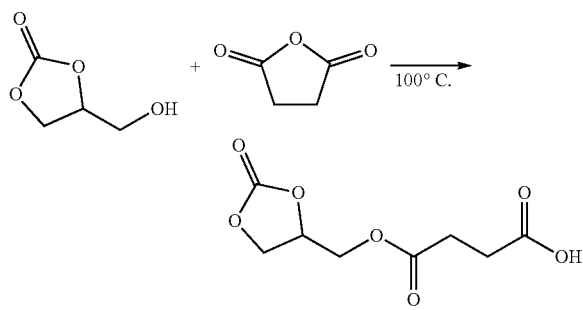

Glycerine carbonate (135 g) and succinic anhydride (115 g) were stirred in a round bottom flask at 100° C., under $N_2$ atmosphere. The 100% conversion—addition of glycerine carbonate to succinic anhydride—was observed after 8 hours, when the determined acid value was constant at a value close to the theoretical one (theoretical Av=257 mg KOH/g; experimental Av=268 mg KOH/g).

Example 3: Synthesis of Carboxy-Terminated Polyesters (Carboxy-PESs)

A)

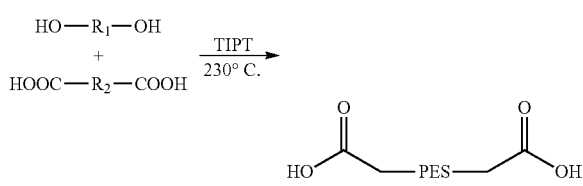

B)

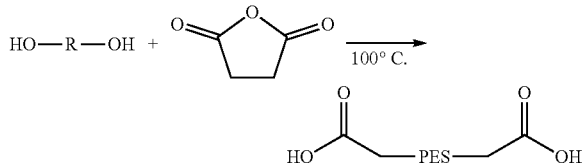

C)

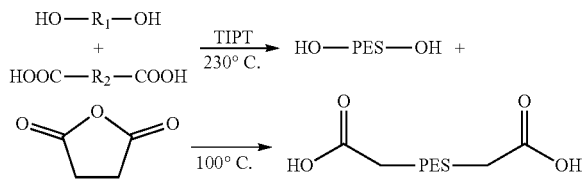

Procedure A: In a 3 neck round bottom flask and under $N_2$ atmosphere, a mixture of di-acids, glycols (with an excess of di-acids) and the catalyst TIPT (0.02 wt. %) was heated up to 230° C. and stirred. When no more water was observed, a vacuum was applied to force the reaction evolution. The reaction is finished when the determined acid value (Av) is constant at a value close to the theoretical one.

Procedure B: In a 3 neck round bottom flask and under $N_2$ atmosphere, a mixture of glycols and succinic anhydride was heated up to 100° C. and stirred. The reaction mixture is kept at these conditions until the determined acid value (Av) is constant at a value close to the theoretical one.

Procedure C: In a 3 neck round bottom flask and under $N_2$ atmosphere, a mixture of di-acids, glycols (with an excess of glycols) and the catalyst TIPT (0.02 wt. %) was heated up to 230° C. and stirred. When no more water is observed, a vacuum was applied to force the reaction evolution. The reaction is finished when the Av is <3 mg KOH/g. Then, the temperature of the reaction mixture is reduced to 100° C. and succinic anhydride is added. The reaction mixture is kept at these conditions until the determined acid value (Av) is constant at a value close to the theoretical one.

Table 1 herein below describes specific Carboxy-PES's obtained by the above described procedures using the identified reactants and amounts thereof.

TABLE 1

| | Carboxy-PESs | | | | | |
|---|---|---|---|---|---|---|
| Polyester | Sebacic Acid (SeA, g) | Isophthalic Acid (IA, g) | Tripropylene glycol (TPG, g) | Glycerol (g) | Succinic Anhydride (g) | Determined Constant Acid Value (Av, mg KOH/g) |
| C1 | 217 | 45 | 174 | | | 111.2 |
| C2 | | | 147 | | 153 | 299.2 |
| C3 | | | | 70 | 230 | 440.7 |
| C4 | 27 | 87 | 169 | | 31 | 73.2 |
| C5 | 36 | 117 | 275 | | 106 | 126.6 |

Example 4: Synthesis of Epoxy-Functional Polyesters (Epoxy-PESs)

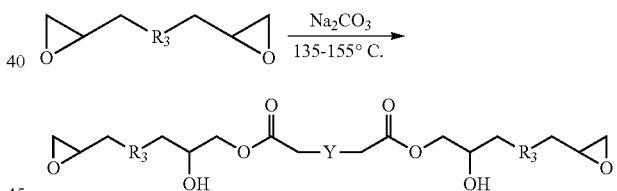

Procedure: In a 3 neck round bottom flask and under $N_2$ atmosphere, a mixture of di-acids, carboxy-PESs, epoxy resins and the catalyst $Na_2CO_3$ (0.02 wt. %) was heated up slowly to 135° C. and stirred during 30 minutes. After that, the reaction mixture was heated up to 155° C. and maintained at those conditions until the measured acid value (Av) was lower than 1 mg KOH/g.

The reactants used and the properties of six Epoxy-PESs made according to this procedure are given in Table 2 herein below.

TABLE 2

| | Epoxy-PESs | | | | | | | | | | | |
|---|---|---|---|---|---|---|---|---|---|---|---|---|
| Epoxy-PESs | Catalyst ($Na_2CO_3$, g) | DER 732 (g) | DER 331 (g) | IA (g) | SeA (g) | C1 (g) | C2 (g) | C3 (g) | C4 (g) | C5 (g) | Final Measured Av (mg KOH/g) | Epoxy Equivalent Weight (g/eq.) |
| E1 | 0.06 | 167 | | | 133 | | | | | | 0.5 | 1298 |
| E2 | 0.06 | 129 | 38 | | | | | | | 134 | 0.5 | 1130 |

TABLE 2-continued

| | | | | | | | | | | | | Final Measured Av | Epoxy Equivalent |
| | Catalyst | DER | DER | | | | | | | | | | |
| Epoxy-PESs | (Na₂CO₃, g) | 732 (g) | 331 (g) | IA (g) | SeA (g) | C1 (g) | C2 (g) | C3 (g) | C4 (g) | C5 (g) | | (mg KOH/g) | Weight (g/eq.) |
|---|---|---|---|---|---|---|---|---|---|---|---|---|---|
| E3 | 0.10 | 137 | | | | | | | | 163 | | 0.7 | 1404 |
| E4 | 0.05 | 179 | | | | | 15 | 16 | | | | 0.6 | 906 |
| E5 | 0.06 | 266 | | 34 | | | | | | | | 0.3 | 900 |
| E6 | 0.06 | 259 | | | 41 | | | | | | | 0.4 | 825 |

Example 5: Synthesis of Cyclic Carbonate Functional Polyesters (Cyclic Carbonate-PESs)

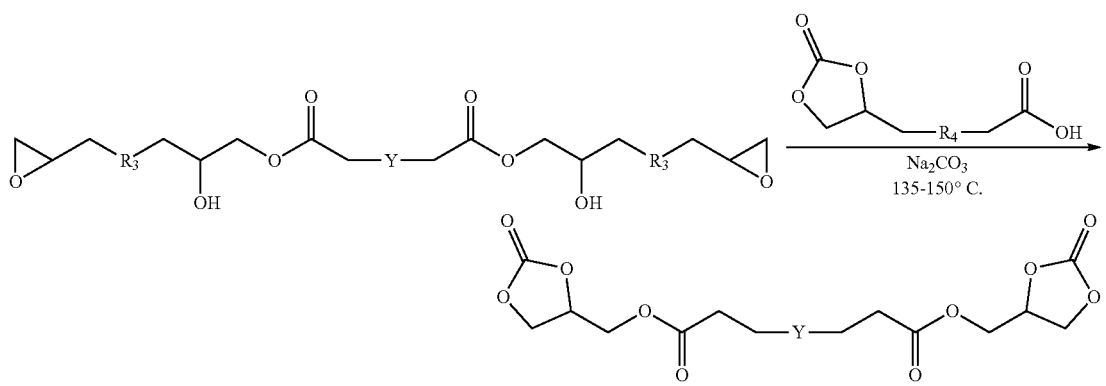

Procedure: In a round bottom flask and under $N_2$ atmosphere, a mixture of epoxy-resins, epoxy-PESs, the corresponding adduct GC-X-COOH (from Ex. 1 and 2) and the catalyst $Na_2CO_3$ (0.02 wt. %) were heated up slowly to 135° C. and stirred during 30 min. After that, the reaction mixture was heated up to 150° C. and maintained at those conditions until the measured acid value (Av) was lower than 1 mg KOH/g.

The reactants used and the properties of eight Cyclic Carbonate Functional Polyesters (Cyclic Carbonate-PESs) made according to this procedure are given in Table 3 herein below.

TABLE 3

| | | | | | | | | | | | | Final Measured Av | Cyclic Carbonate Equivalent |
| Cyclic Carbonate PESs | Catalyst (Na₂CO₃, g) | Erisys GE-35H (g) | DER 732 (g) | GC-Glut (g) | GC-Succ (g) | E1 (g) | E2 (g) | E3 (g) | E4 (g) | E5 (g) | E6 (g) | (mg KOH/g) | Weight (g/eq.) |
|---|---|---|---|---|---|---|---|---|---|---|---|---|---|
| CC1 | 0.04 | 148 | | 52 | | | | | | | | 0.9 | 901 |
| CC2 | 0.04 | | 121 | | 79 | | | | | | | 0.9 | 593 |
| CC3 | 0.02 | | | 15 | 135 | | | | | | | 0.9 | 2327 |
| CC4 | 0.05 | | | 25 | 125 | | | | | | | 0.5 | 1375 |
| CC5 | 0.05 | | | 20 | | 130 | | | | | | 1.0 | 1788 |
| CC6 | 0.05 | | | 28 | | | 122 | | | | | 0.6 | 1238 |
| CC7 | 0.03 | | | 29 | | | | | 122 | | | 5.1 | 1216 |
| CC8 | 0.03 | | | 34 | | | | | | | 128 | 0.7 | 1118 |

Example 6: Adhesive Formulations

Six adhesive formulations (AF1-AF6) were prepared by mixing three of the above defined cyclic carbonate functionalized polyesters (Table 3: CC2, CC4 and CC6) with nucleophiles. The formulations are defined in Table 4 herein below.

TABLE 4

Adhesive Formulations

| Formulation | CC2 (g) | CC4 (g) | CC6 (g) | PEI (g) | Jeffamine EDR-176 (g) |
|---|---|---|---|---|---|
| AF1 | 2.61 | | | 0.39 | |
| AF2 | 2.79 | | | 0.21 | 0.20 |
| AF3 | | 2.82 | | 0.18 | |
| AF4 | | 2.91 | | 0.09 | 0.09 |
| AF5 | | | 2.79 | 0.21 | |
| AF6 | | | 2.89 | 0.11 | 0.11 |

Utilizing these adhesive formulations, lap shear tests were performed according to DIN EN 1465 and using the following substrates: PC-PC; steel-steel; ABS-ABS; and PP-PP. The results of the tests performed at room temperature are shown in Table 5 herein below.

TABLE 5

Lap Shear Strengths

| Composition | PC-PC (MPa) | Steel - Steel (MPa) | ABS - ABS (MPa) | PP-PP (MPa) |
|---|---|---|---|---|
| AF1 | 0.4 | 1.8 | 0.5 | 1.1 |
| AF2 | 0.6 | 1.2 | 0.4 | 0.9 |
| AF3 | 0.5 | 2.3 | 0.5 | 1.3 |
| AF4 | 0.5 | 1.2 | 0.4 | 0.7 |
| AF5 | 0.5 | 1.3 | 0.3 | 1.0 |
| AF6 | 0.5 | 0.7 | 0.2 | 0.7 |

The invention claimed is:

1. A method for preparing a cyclic carbonate functional polyester, said method comprising:
   reacting glycerine carbonate with an anhydride to form an Adduct (A);
   providing a polycarboxylic acid;
   reacting the polycarboxylic acid with at least one diglycidyl ether to form an epoxy functional polyester; and,
   reacting the Adduct (A) with the epoxy functional polyester at to form the cyclic carbonate functional polyester (CC-PES).

2. The method according to claim 1, wherein the anhydride is selected from the group consisting of: maleic anhydride; adipic anhydride; succinic anhydride; alkyl succinic anhydrides; alkenyl succinic anhydrides; glutaric anhydride; alkyl glutaric anhydrides; alkenyl glutaric anhydrides; and mixtures thereof.

3. The method according to claim 1, wherein the reaction of the glycerine carbonate with the anhydride is performed under at least one of the following limitations:
   i) at an anhydride: glycerine carbonate molar ratio in the range from 2:1 to 0.8:1;
   ii) at a temperature in the range from 60° to 180° C.;
   iii) under anhydrous conditions.

4. The method according to claim 1, wherein:
   the polycarboxylic acid comprises a carboxyl functional polyester (Carboxy-PES).

5. The method according to claim 4, wherein the carboxyl functional polyester (Carboxy-PES) has an acid value (Av) of from 50 to 500 mgKOH/g.

6. The method according to claim 1, wherein
   the polycarboxylic acid comprises a carboxyl functional polyester (Carboxy-PES) and the step of providing the carboxyl functional polyester (Carboxy-PES) comprises:
   providing a polyester having two or more hydroxyl groups; and,
   reacting the polyester having two or more hydroxyl groups with a carboxylic acid or an anhydride thereof.

7. The method according to claim 6, wherein the polyester having two or more hydroxyl groups has a hydroxyl number of from 50 to 300 mgKOH/g.

8. The method according to claim 4, wherein said carboxyl functional polyester (Carboxy-PES) is the reaction product of a stoichiometric excess of a dicarboxylic acid and at least one diol in the presence of a catalytic amount of an esterification catalyst.

9. The method according to claim 1, wherein at least one of the diglycidyl ethers has an epoxy equivalent weight of from 100 to 700 g/eq.

10. The method according to claim 1, wherein the polycarboxylic acid comprises a carboxyl functional polyester (Carboxy-PES) and a molar ratio of the diglycidyl ether compounds to the carboxyl functional polyester is from 1.5:1 to 3:1.

11. The method according to claim 1, wherein the steps of reacting the polycarboxylic acid with at least one diglycidyl ether and reacting the epoxy functional polyester with the Adduct (A) are performed:
   i) at a temperature in the range from 40° to 180° C.; and / or
   ii) in the presence of a catalytic amount of a basic catalyst.

12. The method according to claim 1, wherein the steps of providing a polycarboxylic acid; reacting the polycarboxylic acid with at least one diglycidyl ether and reacting the epoxy functional polyester with the Adduct (A) are carried out sequentially in one vessel and without separation of the intermediate products.

13. The method according to claim 1, wherein in the reaction of the epoxy functional polyester with the Adduct (A), an equivalence ratio of the carboxyl groups to the epoxy groups is at least 1:1.

14. The method according to claim 1, wherein in the reaction of the epoxy functional polyester with the Adduct (A), an equivalence ratio of the carboxyl groups to the epoxy groups is in the range from 1.0 : 1 to 1.2 : 1.

15. A cyclic carbonate functional polyester obtained by the method of claim 1, having at least one of:
   a cyclic carbonate equivalent weight of 400 to 2500 g/eq.;
   a number average molecular weight (Mn) of from 500 to 5000 g/mol;
   an OH value of from 50 to 300 mgKOH/g.

16. A curable coating, adhesive or sealant composition comprising:
   the cyclic carbonate functional polyester of claim 15; and
   at least one multifunctional compound having at least two functional groups each independently selected from the group consisting of: primary amino groups; secondary amino groups; hydroxy groups; phosphine groups; phosphonate groups; mercaptan groups and combinations thereof.

17. Cured reaction products of a composition comprising:
the cyclic carbonate functional polyester of claim 15; and
at least one multifunctional compound having at least two functional groups each independently selected from the group consisting of: primary amino groups; secondary amino groups; hydroxy groups; phosphine groups; phosphonate groups; mercaptan groups and combinations thereof.

18. The method of claim 1 wherein the diglycidyl ether is not a bisphenol A diglycidyl ether or a bisphenol F diglycidyl ether.

* * * * *

UNITED STATES PATENT AND TRADEMARK OFFICE
CERTIFICATE OF CORRECTION

PATENT NO. : 11,161,935 B2
APPLICATION NO. : 16/673050
DATED : November 2, 2021
INVENTOR(S) : Miguel Paradas-Palomo et al.

Page 1 of 1

It is certified that error appears in the above-identified patent and that said Letters Patent is hereby corrected as shown below:

In the Claims

Column 27, Line 50 in Claim 1, change "at to form" to --to form--.

Signed and Sealed this
Seventh Day of March, 2023

Katherine Kelly Vidal
*Director of the United States Patent and Trademark Office*